UNITED STATES PATENT OFFICE.

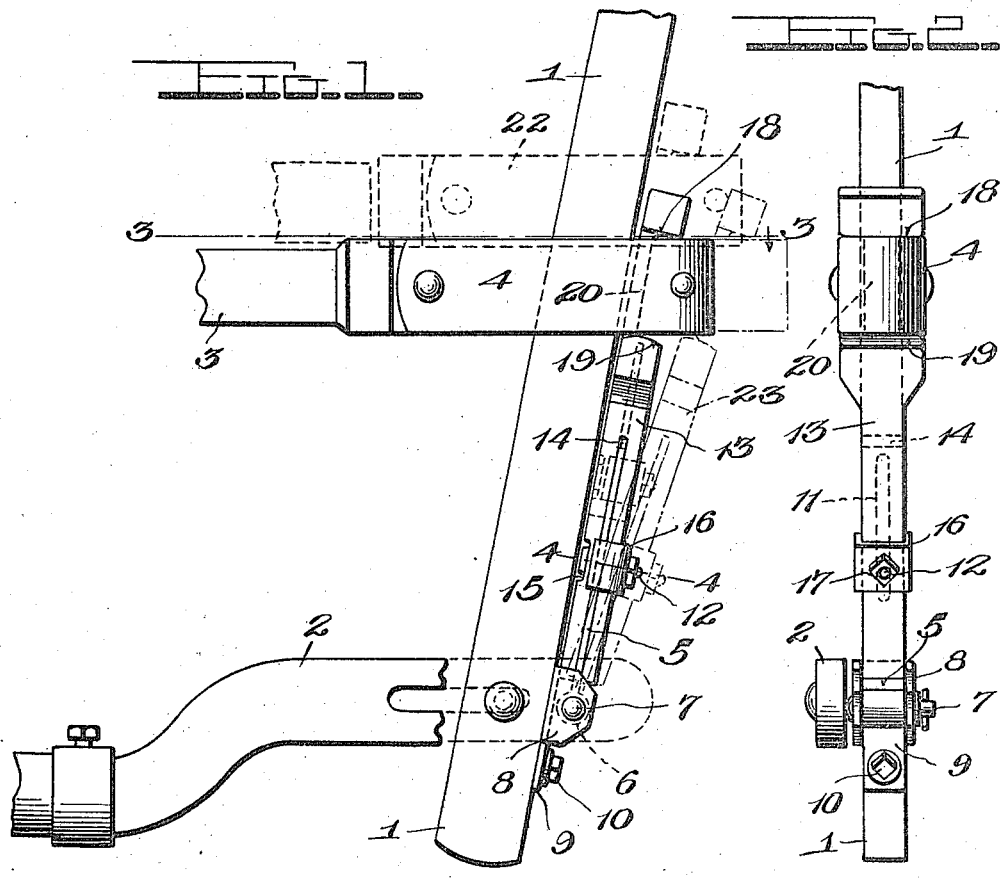
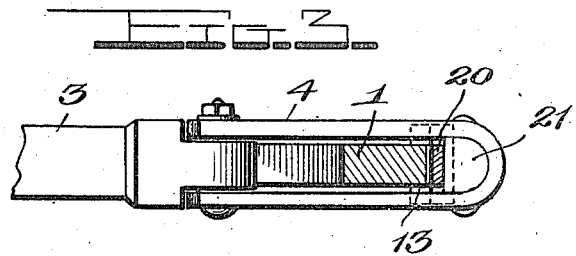
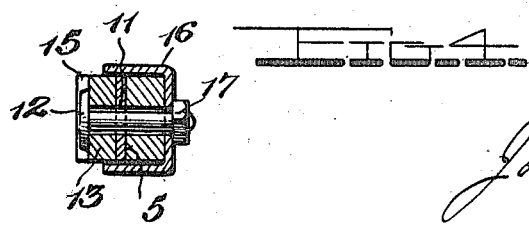

JOHN W. McLAREN, OF PROVIDENCE, RHODE ISLAND.

PICKER MECHANISM FOR LOOMS.

1,236,194.   Specification of Letters Patent.   Patented Aug. 7, 1917.

Application filed January 9, 1917. Serial No. 141,460.

*To all whom it may concern:*

Be it known that I, JOHN W. McLAREN, a citizen of the United States, residing at Providence, in the county of Providence and State of Rhode Island, have invented a new and useful Improvement in Picker Mechanism for Looms, of which the following is a specification.

This invention relates to certain new and useful improvements in picker mechanism for looms and more particularly to a sweep strap supporter and power adjuster which is carried by the picker stick.

The principal object is to provide a simplified form of sweep strap supporter to be carried by the picker stick for adjustment and thereby allow of the supporter being adjusted so as to exert more or less power through said picker stick to accommodate for the weaving of cloths having different weights.

In the drawings—

Figure 1 is a side elevation of the present invention as applied to a picker stick.

Fig. 2 is a rear elevation thereof.

Fig. 3 is a horizontal section taken about on line 3—3 of Fig. 1, and

Fig. 4 is a similar view through the sweep strap supporter taken on line 4—4 of Fig. 1.

Referring more in detail to the drawings, the picker stick 1 is connected to the lay shaft arm 2 in the usual manner, and above this arm is the sweep stick 3 which is connected to the picker stick by the sweep strap or loop 4, said strap being supported adjustably, relative to the picker stick, by the device constituting the present invention now to be described.

The sweep strap supporter and power adjuster consists of two sections, the lower section 5 consisting of a flat metal bar having its lower end in the form of an eye 6 through which a pivot pin 7 passes. This pin is journaled in the sides of the U-shaped bracket 8 that has a base extension 9 through which a securing bolt 10 is passed for mounting the supporter on the picker stick. The free or swinging end portion of the lower section is provided with a longitudinal slot 11 through which the adjusting bolt 12 is passed.

The upper section 13 of the supporter is preferably of wood and is provided with a slot 14 extending upwardly from the lower end, said slot receiving the lower section 5 in a telescopic manner. The adjusting bolt 12 is carried by the upper section, having its head seating in a recess 15 on the inner face of said upper section and its threaded end protruding through the outer face to provide a support for a U-shaped clip 16. This clip is secured in place by nut 17 and straddles the sections so as to have its arms extend over the lower section, as shown in Figs. 1 and 4, and thereby reinforce the connection between the sections.

Section 13 has its enlarged upper end cut away to provide upper and lower shoulders 18 and 19 that are joined at their inner edges by a narrow neck 20 so as to contact with the picker stick for reinforcement, said shoulders extending laterally and outwardly from said neck to form a seat or groove in which the sweep strap engages and the lower shoulder 19 having a convex surface for the strap to bear on.

The sweep strap has a filler block 21 which bears on the neck 20 and thereby saves wear on the strap itself.

From the foregoing it is obvious that the loom may be employed for weaving cloths differing in textures and weights, the power applied to the picker stick being augmented or diminished by properly adjusting the supporter. For instance, upon loosening nut 17, the upper section of the supporter may be adjusted so as to increase the leverage, as indicated at 22 in dotted lines, and thereby render the picker stick capable of throwing a heavier shuttle.

Under normal conditions, with the picker stick in its further outward position, any back lash of the sweep is accommodated for by the pivotal mounting of the supporter, such action causing the latter to assume the dot and dash position indicated at 23.

Having thus described my invention, what I claim as new and desire to secure by Letters Patent is—

1. A sweep strap supporter comprising a picker stick, a U-shaped bracket secured thereto, a lower supporter section having an eye on its lower end and its upper end portion longitudinally slotted, a pin passing through the eye and pivotally mounting the lower section on the bracket, an upper supporter section having its lower end slotted to receive slidably the lower section and its upper end cut away to form a sweep strap seat extending from side to side about the outer face, an adjusting fastener carried by the upper section and passing through the slot of the lower section, and a U-shaped clip carried by the fastener and straddling the lower slotted end of the upper section.

2. A sweep strap supporter comprising a picker stick, a lower supporter section having pivotal connection at its lower end with the picker stick, an upper supporter section having its upper end formed with a sweep strap seat and its lower end slotted to receive the lower section, the latter having an elongated opening covered by the slotted section, an adjusting fastener carried by upper section and passing through the elongated opening of the lower section, and a U-clip secured on the outer side of the upper section by the fastener to straddle the slotted end thereof, the sides of the U-clip terminating short of the inner side of the upper section and said fastener being set in the inner side of said upper section whereby said inner side may be disposed next to the picker stick.

3. A sweep strap supporter comprising a flat metallic section having one end transversely bent to form an eye, a sweep strap carrying section provided with a slot adjustably receiving the opposite end of the metallic section, means adjustably securing the sections together, a mounting bracket having spaced sides for alinement with and receiving therebetween the eye and lower end of said metallic section, and a pivot pin passing through the eye of the first section and securing the latter to the bracket.

In testimony whereof I have signed my name to this specification in the presence of two subscribing witnesses.

JOHN W. McLAREN.

Witnesses:
ADA E. HAGERTY,
J. A. MILLER.

Copies of this patent may be obtained for five cents each, by addressing the "Commissioner of Patents, Washington, D. C."